United States Patent
Brandt, Jr.

(10) Patent No.: US 8,235,252 B2
(45) Date of Patent: Aug. 7, 2012

(54) HIGH-SPEED ACTUATOR FOR VALVES

(76) Inventor: Robert O. Brandt, Jr., Wilmington, NC (US)

(*) Notice: Subject to any disclaimer, the term of this patent is extended or adjusted under 35 U.S.C. 154(b) by 951 days.

(21) Appl. No.: 12/287,814

(22) Filed: Oct. 14, 2008

(65) Prior Publication Data

US 2010/0090144 A1    Apr. 15, 2010

(51) Int. Cl.
*F16K 31/02* (2006.01)
(52) U.S. Cl. .......... 222/185.1; 222/322; 222/460; 222/559; 251/129.1; 251/129.21
(58) Field of Classification Search .......... 222/185.1, 222/409, 322, 460, 559; 251/129.18–129.21, 251/129.22, 129.09, 129.1
See application file for complete search history.

(56) References Cited

U.S. PATENT DOCUMENTS

| | | | |
|---|---|---|---|
| 2,721,100 A * | 10/1955 | Bodine, Jr ................... 239/99 |
| 3,447,776 A * | 6/1969 | Blumer ........................ 251/65 |
| 3,942,485 A * | 3/1976 | Suda et al. .................. 123/490 |
| 4,084,626 A | 4/1978 | King |
| 4,275,693 A * | 6/1981 | Leckie ....................... 123/447 |
| 5,028,856 A | 7/1991 | Zannis |
| 6,892,971 B2 * | 5/2005 | Rieger et al. .............. 239/585.1 |
| 2009/0312852 A1 * | 12/2009 | Yuan et al. ................... 700/37 |

* cited by examiner

*Primary Examiner* — J. Casimer Jacyna
(74) *Attorney, Agent, or Firm* — MacCord Mason PLLC

(57) ABSTRACT

A high-speed actuator moves a valve stopper to a selected position to control material flow. The actuator includes a rod carrying first and second axially spaced solenoid armatures attached to the stopper. First and second solenoid coil surround and are spaced from the rod to bias the first solenoid armature along with the rod and valve stopper. A linear variable differential transformer (LVDT) responsive to the position of the second armature determines the instantaneous position of the valve stopper. A valve position control circuit receives a valve position set point from a user's input, and a valve position feedback signal from the LVDT. The valve position control circuit includes first and second solenoid coil drive signals that urge the first armature and stopper to the valve position set point. A signal generator circuit vibrates the valve about a set point to enhance material discharge.

33 Claims, 2 Drawing Sheets

HIGH-SPEED ACTUATOR FOR VALVES

BACKGROUND OF THE INVENTION (1) Field of the Invention

The present invention relates to a high-speed actuator usable to precisely control a valve for dispensing bulk materials. In particular, the present invention is particularly well suited for rapidly controlling the position of valve stoppers used to dispense bulk materials such as powders from a gravity-feed bulk materials hopper.

(2) Description of the Prior Art

Bulk material dispensers are used to dispense powdered materials such as coffee, tea, sugar and the like. Powdered bulk materials such as these are very difficult to dispense accurately. One problem is that hopper type dispensers have a discharge valve that up until now cannot be rapidly and precisely controlled between fully open and fully closed positions. Moreover, powdered type bulk materials tend to clump together as they pass the discharge valve and into a discharge conduit. What is needed is a high-speed actuator usable to rapidly and precisely control the position of a discharge valve stopper in a bulk material dispenser by precisely controlling the percentage of openness of the discharge valve between its fully open and fully closed positions. Further still, the high-speed actuator should include a means to urge the breakup and passage of clumped powder type material as it passes the discharge valve and into a discharge conduit, as well as through the discharge conduit.

SUMMARY OF THE INVENTION

The present invention provides an improved high-speed actuator that allows for highly accurate discharge valve positioning, while at the same time breaks up clumped powder type material as it passes the dispenser's discharge valve and exits the dispenser's discharge conduit. In particular, the present invention improves the accuracy of dispensing bulk materials such as powders from a bulk materials hopper, by precisely controlling the percentage of openness between the discharge valve's fully open and fully closed positions. Moreover, the present invention includes a means to urge the breakup of clumped powder material, while at the same time maintaining the precise control of the discharge valve's position. For the purpose of this disclosure, a valve is a device that regulates the flow of substances (e.g., gases, fluidized solids, slurries, or liquids) by opening, closing, or partially obstructing various passageways. A valve typically includes a valve stopper and a valve seat.

Generally, the present invention is a high-speed actuator to move a valve stopper between a closed position against a valve seat and an open position away from the valve seat. The actuator includes a hollow rod carrying first and second axially spaced solenoid armatures. The rod also has a connector end for connecting the valve stopper to the rod.

A first solenoid coil surrounds and is spaced from the rod to bias the first solenoid armature along with the rod and valve stopper toward the valve's open position. A second solenoid surrounds and is spaced from the rod. The second solenoid is axially spaced from the first solenoid to bias the first armature towards the valve's closed position, and thereby urging the rod and valve stopper towards the valve's closed position. The second armature is carried along as the rod moves either towards or away from the valve's fully opened or closed position.

A linear variable differential transformer (LVDT) magnetically coupled to the second solenoid armature is included to determine the instantaneous position of the valve stopper relative to the valve's seat. The LVDT is responsive to the position of the second armature, and generates an instantaneous valve position signal as the rod, valve stopper and second armature all move in concert with the first armature. It is important to note that electromechanical variable resistors or potentiometers having a wiper attached to the rod would only be considered for position feedback in low-speed, low-repetition actuator applications due to a relatively high production of mechanical friction. In contrast, an LVDT is very durable in high-speed, high repetition actuator applications due to its lack of contact between its moving armature and measuring coils, which results in relatively friction-free operation.

Another important advantage to using an LVDT for position feedback with the present invention is its infinite resolution capability that is limited only by the noise in an LVDT signal. As a result, an LVDT has superior position-measuring repeatability.

A control means is included for controlling the flow of electrical current through the first and second solenoid coils. The control means controls the solenoid coil currents based on the instantaneous valve position signal generated by the LVDT and a desired valve position signal.

In particular, the control means has a signal summing means that produces a valve position error signal by summing together the desired valve position signal with the instantaneous valve position signal. The desired valve position signal may come from a process controller such as a digital processor or from a human controller using an analog or digital input device.

In a preferred embodiment, the control means further includes a proportional-differential-integral (PID) compensator to scale and compensate the valve position signal to maximize the response of the controller such that the instantaneous valve position matches the desired valve position in the least amount of time. The proportional or P element of the PID makes a change to the valve position error that is proportional to the current error value. The integral or I element is proportional to both the magnitude of the error and the duration of the error, while the differential or D element is used to reduce the magnitude of the overshoot produced by the integral or I element.

The control means also includes a first translating means to translate the valve error signal into a first pulse modulated signal having a pulse width that increases as the valve position error signal increases. A first driver means being responsive to this first modulated signal is for driving the first solenoid coil with electrical current, which in turn generates a magnetic field that attracts the first solenoid armature towards the center core of the first solenoid.

Similarly, the control means further includes a second translating means to translate the valve error signal into a second pulse modulated signal having a pulse width that decreases as the valve position error signal increases. Also included, is a second driver means that is responsive to the second modulated signal for driving the second solenoid with electrical current, which in turn generates a magnetic field that attracts the first armature towards the center core of the second solenoid. In this way, the first and second solenoid coils generate opposing magnetic fields that will pull the first solenoid armature in opposite directions.

In operation, a user inputs a desired valve position set point. This desired valve position signal is summed together with a negative feedback instantaneous valve position signal from the LVDT. The PID compensates the signal for best response and then the first and second translating means provide pulse width modulated signals that drive the first and second solenoids with current, which in turn generates magnetic fields to urge the first armature and valve stopper toward the desired valve position. An updated instantaneous valve position signal is then generated since the second armature moves in concert with the first armature and this process control continues until the instantaneous valve position settles onto the desired valve position set point.

Although the above description discusses the control of a valve, the high-speed actuator of the present invention is useable to accurately and rapidly control the position of various other types of components. Components controllable by the present high-speed actuator can be but are not limited to diverters, latches and flappers. In fact, any device that requires repetitive, high speed accurate positioning could make use of the present invention. For example, robotic devices could naturally benefit from the present invention. These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
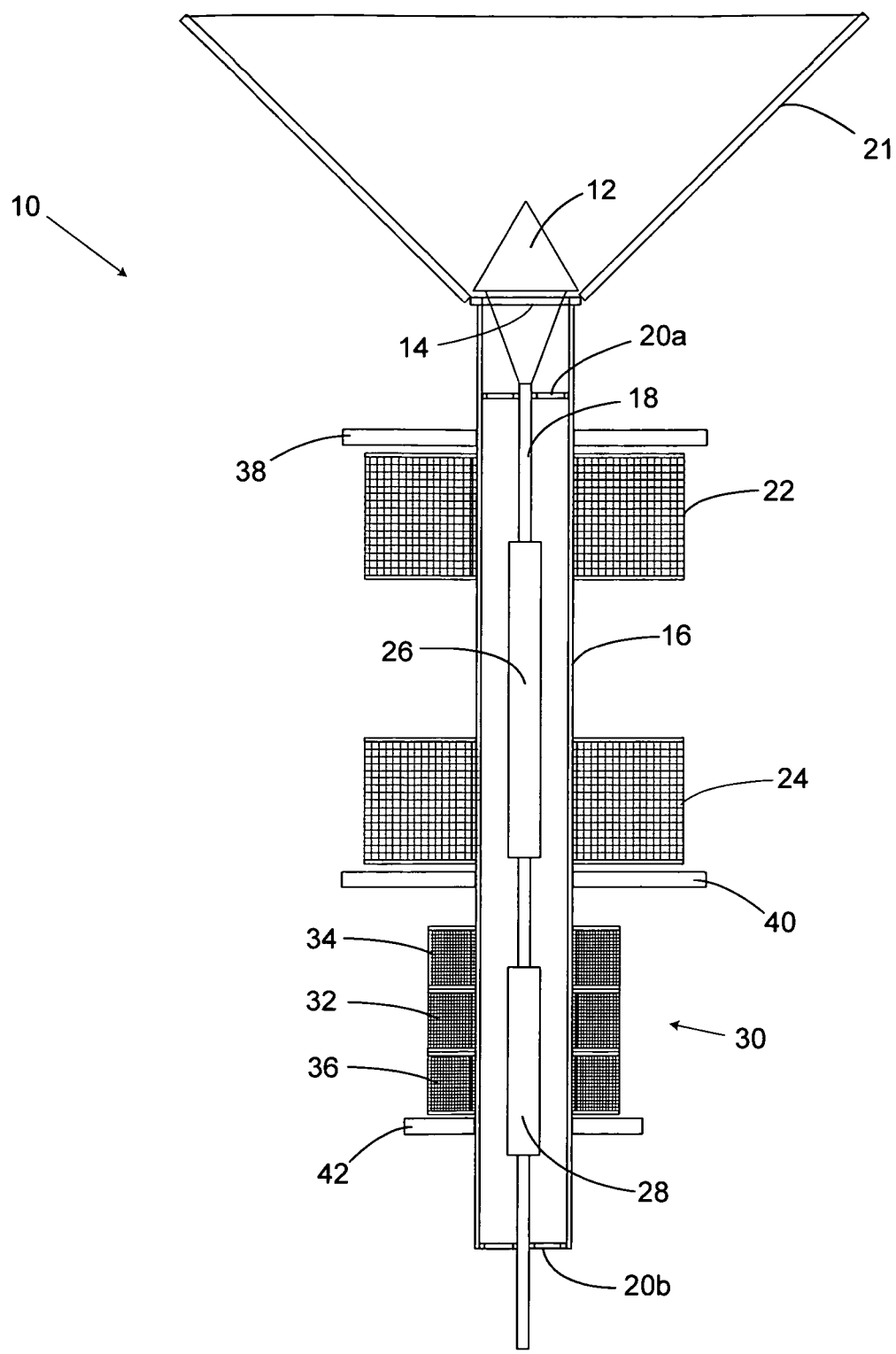
FIG. 1 is a cross section view of the high-speed actuator according to the present invention.

FIG. 1 depicts one embodiment of the present invention, which is a high-speed actuator, generally 10. Actuator 10 includes a discharge valve stopper 12 that has a closed position against a valve seat 14 and an open position extended away from valve seat 14. The stroke of the valve is selected such that material flow past valve stopper 12 is maximized when valve stopper 12 is in its open position. For the purposes of this disclosure the fully open position is considered to have an openness value of 100% and the fully closed position is considered to have an openness value of 0%.

As shown in FIG. 1, high-speed actuator 10 also includes a discharge conduit 16 that extends from valve seat 14. Discharge conduit 16 is made of a non-magnetic material such as non-magnetic stainless steel. It is preferred that conduit 16 is a tube having an inside diameter that is sized to allow the discharge of a given material under the force of gravity.

A rod 18 attached to valve stopper 12 extends from valve stopper 12 and is centrally supported within discharge conduit 16 by rod supports 20a and 20b. Both of supports 20a and 20b include openings for discharging material to pass though. Rod 18 is made of a non-magnetic material such as brass, aluminum or non-magnetic stainless steel. Moreover, rod 18 may be solid or hollow, round or square. However, in choosing a material, care should be taken to insure that the rod is able to withstand the loads and acceleration forces it will experience during valve actuation. For example, rod 18 and the load it bears will typically experience millions of repetitions of 50G acceleration or more.

FIG. 1 also shows a gravity-feed hopper 21 that is useable to feed bulk material towards valve stopper 12 and discharge conduit 16. However, it is important to note that hopper 21 can be replaced by other types of material containers, such as those used to contain liquids and gases. Therefore, actuator 10 can be just as useful for accurately discharging liquids and gases.

In the preferred embodiment as shown in FIG. 1, high-speed actuator 10 further comprises a linear motor having spaced first and second solenoid coils, 22 and 24 respectively. Solenoid coils 22 and 24 are positioned around discharge conduit 16 and a first armature 26 carried on rod 18.

Staying with FIG. 1, a linear variable differential transformer (LVDT), generally 30 has a primary coil 32 and secondary coils 34 and 36 that are positioned around discharge conduit 16, and second armature 28 carried on rod 18. LVDT 30 requires support circuitry to provide signal conditioning and primary coil excitation. The preferred embodiment of the present invention uses an integrated circuit signal conditioner such as Analog Devices™ AD698APZ LVDT conditioner chip. Magnetic shields 38, 40 and 42 are for preventing undesirable magnetic coupling between solenoids 22 and 24 and LVDT 30 as well as any sensitive electronics that may be in close proximity of actuator 10.

It is preferred that the cross-sectional areas of first and second solenoid armatures 26 and 28 along with rod 18 each be in a range of 10-50% of the cross-sectional area of the inside diameter of conduit 16 to allow the free flow of discharging material through conduit 16. A current amplifier is provided for driving LVDT primary coil 32 to make up for the loss of magnetic coupling between LVDT primary coil 32 and second armature 28 due to the relatively small cross-sectional area of second armature 28.

Figure 2:
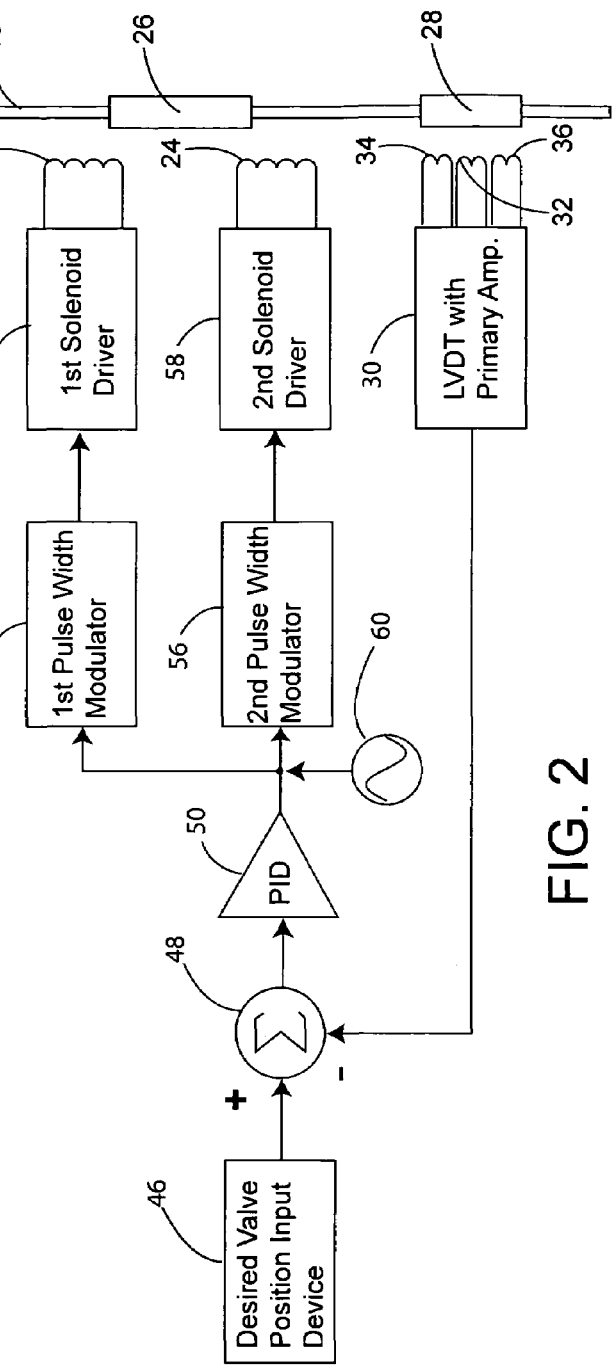
FIG. 2 is a block diagram of the control circuit for controlling the high-speed actuator according to the present invention.

As shown in FIG. 2, a valve position control means is a circuit, generally 44 that is adapted to receive an instantaneous valve position feedback signal from LVDT 30. Valve position control circuit 44 is also adapted to receive a discharge valve set point from a user's input using an input device 46. A signal summing means 48 produces a valve position error signal by summing the user's desired valve position signal (i.e., valve position set point) together with the instantaneous valve position signal generated by LVDT 30. The signal summing means preferably comprises a summing operational amplifier circuit that outputs a valve position error signal voltage.

Preferably, a proportional-integral-differential (PID) sub-circuit 50 is included in control circuit 44 to compensate the valve position error signal to minimize position error settling time. The proportional or P element of PID 50 makes a change to the valve position error that is proportional to the current error value. The integral or I element is proportional to both the magnitude of the error and the duration of the error, while the differential or D element is used to reduce the magnitude of the overshoot produced by the integral or I element.

A user can select which control elements to use for a desired control response. For example, the user may choose to eliminate the differential element of PID 50 in favor of using only proportional-integral elements if a significant amount of noise is present in an input signal, since the differential element is overly sensitive to noise. Moreover, in simple process control systems only the proportional or P element might be used. Therefore, controller 44 is not limited to any particular combinations of PID control. Typically, the output of PID 50 is a Verror voltage in the range of 0-5V and represents the valve position signal after PID compensation. However, other signals such as 2-10V or 4-20 mA signals could also be used for the output of PID 50.

Figure 3:
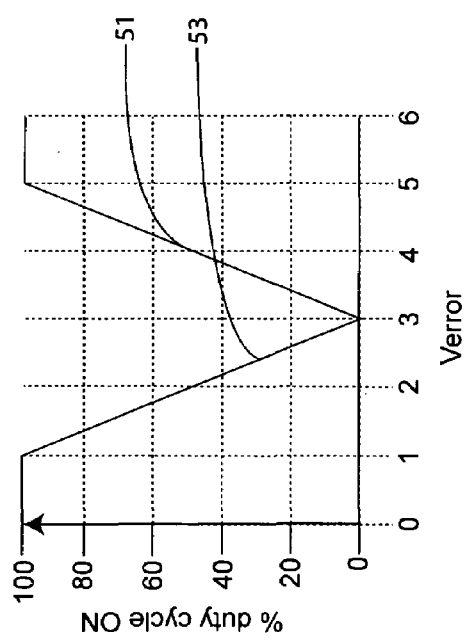
FIG. 3 is a transfer characteristic for the control circuit of FIG. 2.

Control circuit 44 also includes a first signal translating means 52 for translating the valve position error signal into a first pulse modulated signal. As depicted in FIG. 3, a preferred transfer characteristic 51 for translating means 52 is a pulse width that increases as the valve position error signal increases. It is preferred that transfer characteristic 51 shows a linear increase in percent duty cycle between 0 and 100% as the voltage Verror increases from 3 to 5V.

A first solenoid driver 54 is for driving solenoid coil 22 with an electrical current that is proportional to the first pulse modulated signal. It is preferred that first solenoid driver 54 be an optically isolated power transistor circuit capable of switching at least ten amperes of current at six hundred volts DC.

A second signal translating means 56 is for translating the valve position error signal into a second pulse modulated signal. As depicted in FIG. 3, a preferred transfer characteristic 53 for translating means 52 is a pulse width that decreases as the valve position error signal increases. As illustrated in FIG. 3, transfer characteristic 53 calls for a linear decrease in percent duty cycle between 100% and 0% on as the voltage Verror increases from 1 to 3V.

A second solenoid driver 58 is for driving solenoid coil 24 with an electrical current that is proportional to the second pulse modulated signal. Like solenoid driver 54, it is preferred that second solenoid driver 58 be an optically isolated power transistor circuit capable of switching at least ten amperes of current at six hundred volts DC.

Preferably, the first and second translating means are analog comparator circuits that compare the Verror voltage of the valve position error signal with a saw-tooth voltage ramp signal generated from a 555 timer circuit configured to produce a highly linear saw-tooth voltage waveform. The comparators each output a voltage pulse that is triggered on and off as the saw-tooth voltage ramp passes through a threshold voltage set by a resistor network and applied Verror voltage. The preferred frequency of the saw-tooth voltage ramp signal is around 275 Hz.

FIG. 2 also depicts a signal generator circuit 60 useable to enhance material flow past discharge valve stopper 12 and through discharge conduit 16 shown in FIG. 1. Signal generator circuit 60 outputs a periodic electrical signal that is integrated with the current output of control circuit 44. This results in a jitter in the outputted current pulses transmitted through solenoids 22 and 24, which in turn generate magnetic pulses that force rod 18 and attached discharge valve stopper 12 to vibrate around an inputted valve position set point. The vibration of rod 18 and discharge valve stopper 12 urge any clumped bulk material to breakup and flow past discharge valve stopper 12 and through discharge conduit 16 in a precisely controlled manner. The preferred periodic waveform generated by generator 60 is sinusoidal with a frequency of around twenty-five Hertz. It is also preferable that the duty-cycle and amplitude of the periodic waveform be user adjustable.

Certain modifications and improvements will occur to those skilled in the art upon a reading of the foregoing description. For example, it is envisioned that larger more forceful solenoids will need larger more powerful solenoid drivers. It should be understood that all such modifications and improvements have been deleted herein for the sake of conciseness and readability, but are properly within the scope of the following claims.

What is claimed is:

1. An apparatus for controlling the flow of material in a material handling apparatus comprised of a material container having a discharge opening, said apparatus comprising:

a) discharge conduit extending from the discharge opening;
   b) a valve having a fully open position and a fully closed position controlling the flow of material from said container through said discharge conduit, said valve including a valve stopper and a valve seat;
   c) a non-magnetic rod carrying first and second axially spaced solenoid armatures, said rod having a connector end connected to said valve stopper and extending from said stopper within said discharge conduit, said rod and said armatures having cross-sectional areas less than the cross-sectional area of said conduit, said rod and first and second armatures each having cross-sectional areas that are in the range 10% to 50% of the cross-sectional area of said discharge conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coil surrounding said conduit to bias said first armature toward said valve's closed position;
   f) a linear variable differential transformer (LVDT) responsive to the position of said second solenoid armature to provide an instantaneous valve position signal; and
   g) a valve position control means adapted to receive a valve position feedback signal from the LVDT and a desired valve position set point signal, said means urging said valve stopper to the desired valve position set point.

2. The apparatus of claim 1, wherein said LVDT has primary and secondary coils positioned around said discharge conduit and axially spaced from said first and second solenoid coils.

3. The apparatus of claim 2, wherein said LVDT primary coil is driven by a current amplifier that compensates for a loss of magnetic coupling with said second armature due to said second armature's cross-sectional area being substantially less than the cross-sectional area of said discharge conduit.

4. The apparatus of claim 1, wherein said control means includes a signal summing means to produce a valve position error signal by summing said desired valve position signal together with said instantaneous valve position signal.

5. The apparatus of claim 4, wherein said control means includes a first signal translating means for translating said valve position error signal into a first pulse modulated signal having a pulse width that increases as said valve position error signal increases.

6. The apparatus of claim 4, wherein said control means includes a second signal translating means for translating said valve position error signal into a second pulse modulated signal having a pulse width that decreases as said valve position error signal increases.

7. The apparatus of claim 5, wherein said control means includes a first driver means for driving said first solenoid coil with electrical current, said first driver means being responsive to said first pulse width modulated signal.

8. The apparatus of claim 6, wherein said control means includes a second driver means for driving said second solenoid coil with electrical current, said second driver means being responsive to said second pulse width modulated signal.

9. The apparatus of claim 4, wherein said control means includes a proportional-integral-differential (PID) compensator for compensating said valve position error signal to minimize position error settling time.

10. The apparatus of claim 1, wherein said control means further includes a sinusoidal signal generator to generate a valve shaking signal.

11. An apparatus for controlling the flow of bulk material from a hopper having a discharge opening, said apparatus comprising:
   a) discharge conduit extending from the discharge opening;
   b) a valve having a fully open position and a fully closed position controlling the flow of material from said hopper through said discharge conduit, said valve including a valve stopper and a valve seat;
   c) a non-magnetic rod carrying first and second axially spaced solenoid armatures, said rod having a connector end connected to said value stopper and extending from said stopper within said discharge conduit, said rod and said armatures having cross-sectional areas less than the cross-sectional area of said conduit, said rod and first and second armatures each having cross-sectional areas that are in the range of 10% to 50% of the cross-sectional area of said discharge conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coil surrounding said conduit to bias said first armature toward said valve's closed position;
   f) a linear variable differential transformer (LVDT) responsive to the position of said second solenoid armature to provide an instantaneous valve position signal; and
   g) a valve position control means adapted to receive a valve position feedback signal from the LVDT and a desired valve position set point signal, said means including first and second solenoid drive signals to move said first armature and said stopper to the desired set point.

12. The apparatus of claim 11, wherein said LVDT has primary and secondary coils positioned around said discharge conduit and axially spaced from said first and second solenoid coils.

13. The apparatus of claim 12, wherein said LVDT primary coil is driven by a current amplifier that compensates for a loss of magnetic coupling with said second armature.

14. The apparatus of claim 11, wherein said control means includes a signal summing means to produce a valve position error signal by summing said desired valve position signal together with said instantaneous valve position signal, 15. The apparatus of claim 14, wherein said control means includes a first signal translating means for translating said valve position error signal into a first pulse modulated signal having a pulse width that increases as said valve position error signal increases.

16. The apparatus of claim 14, wherein said control means includes a second signal translating means for translating said valve position error signal into a second pulse modulated signal having a pulse width that decreases as said valve position error signal increases.

17. The apparatus of claim 15, wherein said control means includes a first driver means for driving said first solenoid coil with electrical current, said first driver means being responsive to said first pulse width modulated signal.

18. The apparatus of claim 16, wherein said control means includes a second driver means for driving said second solenoid coil with electrical current, said second driver means being responsive to said second pulse width modulated signal.

19. The apparatus of claim 14, wherein said control means includes a proportional-integral-differential (PID) compensator for compensating said valve position error signal to minimize position error settling time.

20. A bulk material dispensing apparatus comprising:
   a) hopper having a discharge opening and a discharge conduit having an inside diameter of a given cross-sectional area extending from said discharge opening;
   b) a valve having a fully open position and a fully closed position controlling the flow of material from said hopper through said discharge conduit, said valve including a valve stopper and a valve seat, said discharge conduit extending from said valve seat;
   c) a non-magnetic rod carrying first and second axially spaced solenoid armatures, said rod having a connector end connected to said valve stopper and extending from said stopper within said discharge conduit, said rod and said armatures having cross-sectional areas less than the cross-sectional area of said conduit, said rod and first and second armatures each having cross-sectional areas that are in the range of 10% to 50% of the cross-sectional area of said discharge conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coil surrounding said conduit to bias said first armature toward said valve's closed position;
   f) a linear variable differential transformer (LVDT) responsive to the position of said second solenoid armature to provide an instantaneous valve position signal; and
   g) a valve position control circuit adapted to receive a valve position feedback signal from the LVDT and a desired valve position set point signal, said circuit urging said valve stopper to the desired valve position set point.

21. The apparatus of claim 20, wherein said LVDT has primary and secondary coils positioned around said discharge conduit and axially spaced from said first and second solenoid coils.

22. The apparatus of claim 21, wherein said LVDT primary coil is driven by a current amplifier that compensates for a loss of magnetic coupling with said second armature.

23. The apparatus of claim 20, wherein said control mean includes signal summing means to produce a valve position error signal by summing said desired valve position signal together with said instantaneous valve position signal.

24. The apparatus of claim 23, wherein said control means includes a first signal translating means for translating said valve position error signal into a first pulse modulated signal having a pulse width that increases as said valve position error signal increases.

25. The apparatus of claim 23, wherein said control means includes a second signal translating means for translating said valve position error signal into a second pulse modulated signal having a pulse width that decreases as said valve position error signal increases.

26. The apparatus of claim 24, wherein said control means includes a first driver means for driving said first solenoid coil with electrical current, said first driver means being responsive to said first pulse width modulated signal.

27. The apparatus of claim 25, wherein said control means includes a second driver means for driving said second solenoid coil with electrical current, said second driver means being responsive to said second pulse width modulated signal.

28. The apparatus of claim 23, wherein said control means includes a proportional-integral-differential (PID) compensator for compensating said valve position error signal to minimize position error settling time.

29. The apparatus of claim 20, wherein said control means further includes a sinusoidal signal generator to generate a valve shaking signal.

30. The apparatus of claim 29, wherein the amplitude and frequency of said valve shaking signal is adjustable via said sinusoidal signal generator.

31. An apparatus for controlling the flow of material in a material handling apparatus comprised of a material container having a discharge opening, said apparatus comprising:
   a) a discharge conduit extending from the discharge opening;
   b) a valve having a fully open position and a fully closed position controlling the flow of material from said container through said discharge conduit, said valve including a valve stopper and a valve seat;
   c) a non-magnetic rod carrying first and second axially spaced solenoid armatures, said rod having a connector end connected to said valve stopper and extending from said stopper within said discharge conduit, said rod and said armatures having cross-sectional areas less than the cross-sectional area of said conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coif surrounding said conduit to bias said first armature toward said valve's closed position;
   f) a linear variable differential transformer (LVDT) having primary and secondary coils positioned around said discharge conduit and axially spaced from said first and second solenoid coils, said LVDT primary coil being driven by a current amplifier that compensates for a loss of magnetic coupling with said second armature due to said second armature's cross-sectional area being substantially less than the cross-sectional area of said discharge conduit, said LVDT being responsive to the position of said second solenoid armature to provide an instantaneous valve position signal; and
   g) a valve position control means adapted to receive a valve position feedback signal from the LVDT and a desired valve position set point signal, said means urging said valve stopper to the desired valve position set point.

32. An apparatus for controlling the flow of bulk material from a hopper having a discharge opening, said apparatus comprising:
   a) a discharge conduit extending from the discharge opening;
   b) a valve having a fully open position and a fully closed position controlling the flow of material from said hopper through said discharge conduit, said valve including a valve stopper and a valve seat;
   c) a non-magnetic rod carrying first and second axially spaced solenoid armatures said rod having a connector end connected to said valve stopper and extending from said stopper within said discharge conduit, said rod and said armatures having cross-sectional areas less than the cross-sectional area of said conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coil surrounding said conduit to bias said first armature toward said valve's closed position;
   f) a linear variable differential transformer (LVDT) having primary and secondary coils positioned around said discharge conduit and axially spaced from said first and second solenoid coils, said LVDT primary coil being driven by a current amplifier that compensates for a loss of magnetic coupling with said second armature due to said second armature's cross-sectional area being substantially less than the cross-sectional area of said discharge conduit, said LVDT being responsive to the position Of said second solenoid armature to provide an instantaneous valve position signal; and
   g) a valve position control means adapted to receive a valve position feedback signal from the LVDT and a desired valve position set point signal, said means including first and second solenoid drive signals to move said first armature and said stopper to the desired set point.

33. A bulk material dispensing apparatus comprising:
   a) a hopper having a discharge opening and a discharge conduit having an inside diameter of a given cross-sectional area extending from said discharge opening;
   b) a valve having a fully open position and a fully closed position controlling the flow of material from said hopper through said discharge conduit, said valve including a valve stopper and a valve seat, said discharge conduit extending from said valve seat;
   c) a non-magnetic rod carrying first and second axially spaced solenoid armatures, said rod having a connector end connected to said valve stopper and extending from said stopper within said discharge conduit, said rod and said armatures having cross-sectional areas less than the cross-sectional area of said conduit, whereby material can flow between said conduit and said armatures;
   d) a first solenoid coil surrounding said conduit to bias said first solenoid armature toward said valve's open position;
   e) a second solenoid axially spaced from said first solenoid, said second solenoid coil surrounding said conduit to bias said first armature toward said valve's closed position;
   f) a linear variable differential transformer (LVDT) having primary and secondary coils positioned around said discharge conduit and axially spaced from said first and second solenoid coils, said LVDT primary coil being driven by a current amplifier that compensates for a loss of magnetic coupling with said second armature due to said second armature's cross-sectional area being substantially less than the cross-sectional area of said discharge conduit, said LVDT being responsive to the position of said second solenoid armature to provide an instantaneous valve position signal; and
   g) a valve position control circuit adapted to receive a valve position feedback signal from the LVDT and a desired valve position set point signal, said circuit urging said valve stopper to the desired valve position set point.

* * * * *